June 13, 1944.  R. L. SMITH  2,351,371

FILM CLEANER

Filed March 22, 1941

INVENTOR
Roland L. Smith
BY Yardley Chittick
ATTORNEY

Patented June 13, 1944

2,351,371

UNITED STATES PATENT OFFICE 2,351,371

FILM CLEANER

Roland L. Smith, Belmont, Mass.

Application March 22, 1941, Serial No. 384,683

3 Claims. (Cl. 88—24)

This invention relates to photography and is particularly concerned with the removal of dust from photographic negatives.

In recent years, the number of cameras utilizing relatively narrow film, as, for example, the 35 mm. moving picture film, has greatly increased, as the cost of such film is not only much less expensive, but the cameras are much smaller, lighter in weight, and easier to manipulate. When pictures are made from such film, it is usually customary to make therefrom enlargements of considerable size. With such enlargements, any imperfections in the negative are enlarged proportionately, and since the cost of an enlargement is substantial, any defect appearing therein is an expensive error.

One of the difficulties in making enlargements from small negatives is the presence of dust particles on the negative. That is, dust particles are usually so small as to escape the eye of the operator, but, nevertheless, when magnified in the making of the enlargement, show up on the print as small white spots, which are very detrimental to the finished appearance. In cold weather, the difficulty with dust specks is particularly acute, as the film often becomes electrified and attracts and holds dust particles more readily. Many schemes have been devised to remove dust from films, but apparently none of them have worked really successfully, as it is still customary for a photographer, in making enlargements, to wipe the film by hand or dust it off with a camel's-hair brush just before placing it in position in the enlarging camera. The difficulty is further accentuated by the fact that the enlargers now on the market make no provision for the removal of such dust particles, even though this condition is one that causes more trouble to the photographer than any other.

None of the dust removal methods now practiced is satisfactory, because even as the dust is removed, other dust particles will immediately land on the film while it is being transferred to its position within the enlarger. Furthermore, the strip film must be removed from the enlarger for dusting every time a new negative frame is to be enlarged.

The enlarging cameras that have come into general use are so constructed that once the film is in place between the condensing and enlarging lenses, there is no opportunity for getting at the film to effect further cleaning. Hence, if the film is not clean when actually in position, nothing can be done about it thereafter, except to remove it and again try to dust it off more effectively. The procedure at best is hit-or-miss.

When using the present invention, however, it is possible to place a strip of film in position in the enlarging camera without any preliminary dusting and then move it picture by picture to make a series of successive prints, each one of which will be entirely free from any showing of dust particles, as the cleaning mechanism will have effectively removed them from the film before the frame to be enlarged reaches its position.

A further object of the invention is to minimize handling of the film. Since it is unnecessary to remove the film for cleaning between exposures, this result is achieved and much time is saved.

While reference is made to the use of the invention in combination with an enlarging camera, it is understood that it may be used with any sort of a projector in which light is passed through a film to produce an enlarged image, whether on light sensitive material or on a screen.

These and other objects of the invention will become more apparent as the description proceeds with the aid of the accompanying drawing, in which Fig. 1 is a diagrammatic showing of an enlarging camera including the film cleaner.

Figure 1:
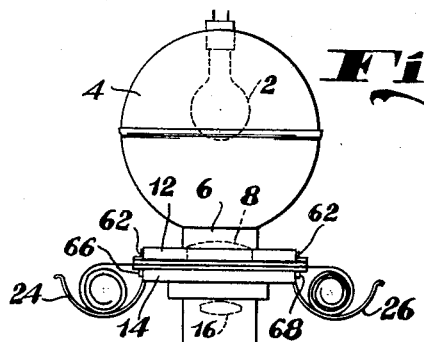

Referring to Fig. 1, the enlarging camera consists essentially of a source of light 2, normally located in a housing 4, having a bottom opening 6 in which is positioned a condensing lens 3. By this arrangement, the diverging light rays are bent to a more concentrated condition on passing through the condensing lens so that there will be greater intensity of light through the negative therebelow.

A platform for supporting the film and its holder is located immediately below the condensing lens and consists of a slot or opening 10 (see Fig. 3) formed by an upper jaw 12 and a lower jaw 14. The vertical dimension of slot 10 is enough to receive the combined film holder and cleaner. Guiding and aligning means are provided so that the film openings therethrough will be in alignment with the light and lenses.

Immediately below the film holder are the projecting lenses 16 and 18, with means for focusing the picture on the sensitized paper 20, which rests on any convenient table or base 22.

At either end of the lower jaw 14 are short gutter-shaped pieces 24 and 26, which are adapted to support the curled ends of the film that extend from either end of the film holder and cleaner.

Figure 2:
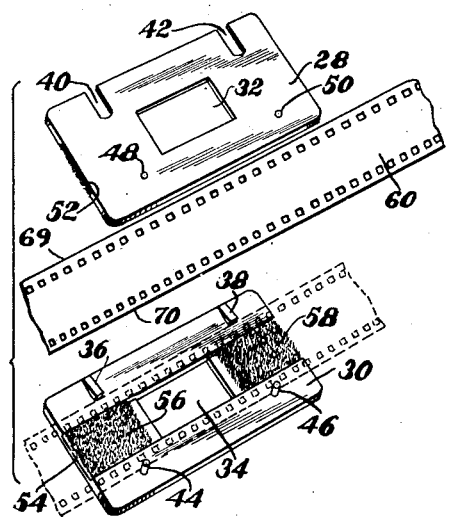
Fig. 2 is an exploded view of the principal parts of the film cleaner, showing a strip of typical film used in connection therewith.

The film holder and cleaner is shown generally in Fig. 2 and consists of an upper plate 28 and a lower plate 30 having aligned apertures 32 and 34 the size of one picture of the film. Means for positively aligning the two plates are provided and they may take any convenient form. However, in the present instance, there are two wedge-shaped members 36 and 38 on the upper surface of bottom plate 30 which will be received by corresponding openings 40 and 42 in upper plate 28. Likewise, there are a pair of pins 44 and 46 in aligned position with holes 48 and 50. It is obvious from this construction that when upper plate 28 is properly located on lower plate 30, the two will be held in position against longitudinal or transverse movement.

In one construction, both the upper and lower plates are longitudinally recessed at 52 and 54 (see Fig. 3), the recess being the width of the apertures 32 and 34, but not as wide as the film. In the recessed areas of both plates, between the ends and the central openings, are positioned cleaning brushes 56 and 58 in the lower plate 30, and two corresponding brushes in the corresponding recesses on the underside of upper plate 28.

Figure 3:
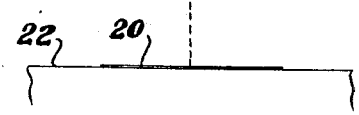
Fig. 3 is an enlarged side elevation of a part of the enlarging camera with the film cleaner and film in place.
Figure 3:
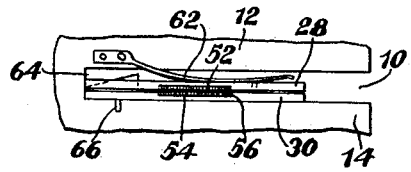

The film used therewith is indicated in Fig. 2 at 60, and when located on the lower plate, assumes the position indicated by the dotted lines. When the upper plate has been placed on the lower plate, the film will be held in position between the two, as indicated in Fig. 3. Members 36 and 38 and pins 44 and 46 guide the film longitudinally as it may be drawn between the two plates upon the application of sufficient force to overcome the frictional resistance of the cleaning brushes which engage both sides of the picture part of the film and the adjacent plate surfaces which engage the longitudinal perforated edges of the film.

The two plates with the film located therebetween may be positioned in slot 10 by inserting them from the front. There is ample clearance between the jaws to permit this, but in order that the film holder may be accurately located within the slot under sufficient pressure, spring clamps 62, one at each end of the jaw 12, provide an adequate downward frictional force against the upper side of top plate 28. The holder is inserted in the slot as far as it will go, finally coming into engagement with the rear at 64. If the enlarging camera is equipped with a condensing lens having means of its own to provide sufficient downward pressure against the film holder, which pressure is usually provided by spring means connected to the condensing lens, the film holder spring clamps 62 may be omitted. The point is that the pressure exerted on the film holder must be adequate to achieve a very firm cleaning action on both sides of the film as it is drawn therethrough. If the pressure is insufficient, some of the dust particles may slide through.

In order that the holder may be located longitudinally, a pair of pins 66 and 68 extend downwardly from the lower plate 30 to straddle the ends of the bottom jaw 14. By this arrangement, the openings 32 and 34 are accurately brought into alignment with the lenses.

The film that extends from the ends of the film holder and dust remover normally assumes a rolled up position, as shown in Fig. 1, and is supported by members 24 and 26.

The cleaning brushes 56 and 58, and the corresponding brushes in upper plate 28, are ordinarily made of the same material. A suitable material for use in this connection has been found to be velvet, which is a silk pile fabric. The pile in such material is soft, close together, and admirably adapted for trapping dust particles. Other types of brushes could be used, provided, however, they have the necessary cleaning characteristics. When the term brush is used, it is to be understood that this is to mean any type of material suitable for the purpose intended, whether it be made of pile, with bristles, of napped cloth, or otherwise.

When the film is in position between plates 28 and 30, it is obvious that by exerting enough pressure, the pile of the brushes may be crushed sufficiently to permit the edges of the film, as at 69 and 70, to be gripped to a greater or less degree by the plates themselves. It is desirable that such condition prevail, as this results in the film being firmly gripped all around the openings 32 and 34. That is, the cleaning brushes grip it at either end while the plates grip it at the sides. This is necessary if the film is to be maintained flat enough for accurate focusing. Film of this character has a natural curl, which results in its assuming, if held only at the ends, a shape that is slightly convex upwardly, whereas, if it is gripped not only at the ends, but also at the sides, the convexity is substantially removed.

With the film holder and film in place in the enlarging camera, the operator grasps the film at either end, sliding it longitudinally until the desired negative has entered the frame. In drawing it to this position, any dust on the film will be trapped and held by the upper and lower brushes, so that the negative, when aligned with the openings 32 and 34, will be dust-free. Since the upper plate 28 is very close to the condensing lens 8 (in some cameras there is means for lowering the condensing lens until it rests on plate 28), there is practically no chance of any further dust accumulation on the upper surface of the film, nor is there any likelihood of dust accumulating on the under surface, because the lower plate 30 resting on lower jaw 14 forms a substantially air-tight and dust-proof chamber over the enlarging lenses.

After one enlargement has been made, the film may be drawn through to the next picture immediately without the necessity of removing the unit from the enlarging camera. The next negative, having passed through the brushes, will likewise be free from dust, so that the enlarged pictures may be made in succession with perfect assurance that they will not show dust spots when developed.

Figure 4:
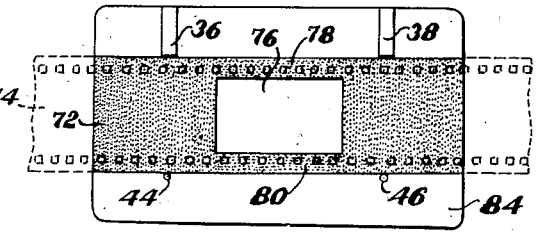
Fig. 4 is a plan view of the lower of the two plates showing a modified form of cleaning element.

If, in the form shown in Fig. 2, the plates are to engage the film directly along the edges, it is necessary that the cleaning brushes be located in recesses as heretofore described. In order to avoid the necessity of recessing the plates, it has been found that the brush construction may be varied somewhat as shown in Fig. 4. In this case, the lower plate has a brush 72 the full width of the negative, which is indicated in dotted lines at 74, the brush material being located not only at the ends of the opening 76, but also at the sides at 78 and 80. The upper plate 82 (see Fig. 5) also has a brush 86 corresponding to brush 72. By this arrangement, the film, when between the plates, is gripped uniformly around the four sides of the opening and it is not necessary to exert any more pressure on the plates than is proper for adequate dust removal and maintenance of the film in flat condition.

In both the constructions shown in Figs. 2 and 4, it is intended that the brushes on each plate shall be positioned about the edges of the opening in such manner that none of the brush fibers or material will overhang the opening far enough to cast their shadow in the picture. Sometimes the brushes are set back from the edge, as shown in Fig. 2, whereas other times the brushes may be close to the edge, as in Fig. 4.

Figure 5:
Fig. 5 is an end elevation of the type shown in Fig. 4, with the film in position therein.

Fig. 5 is an end view of the plates and brushes of Fig. 4 in use with a film in position therebetween. The upper plate 82 and the lower plate 84 are not recessed, and the cleaning brushes 86 and 72 lie directly on the inner faces. The film indicated at 88 is gripped uniformly by the brushes throughout its entire width. When this arrangement of plates and brushes is positioned in the camera, it will be held in proper alignment through the mechanism already described, namely, the springs 62, the back of the jaw 64 and the aligning pins 66 and 68.

Figure 6:
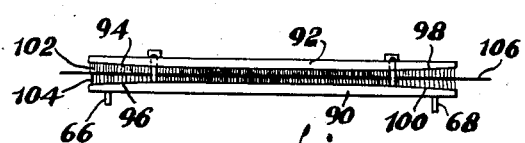
Fig. 6 is a front elevation of another modification of film cleaner with the film in position therein.

In Fig. 6 is shown a modified construction designed to remove dust particles gradually from the film as it enters the cleaner. Where the brush surfaces are parallel and offer uniform pressure against the film, the dust particles tend to be collected at the outer edges of the brushes as the film is drawn therein. If the pressure against the film is graduated from the outer edges of the plates inwardly, it is apparent that the film entering the brushes would first have those dust particles removed that could be displaced by light brush pressure, while those dust particles which required heavier pressure would be removed from the film only after they had moved a greater distance between the brushes.

This desirable result is accomplished by having the inner surfaces of the ends of the plates 90 and 92 diverge slightly, as at 94, 96, 98 and 100. Thus, if cleaning brushes 102 and 104 of uniform pile thickness are placed on the inner faces of the plates and the two in turn are pressed uniformly against a film 106 therebetween, it is apparent that the brush pressure at the outer ends of the plates will be less than that at the interior, and the pressure will uniformly increase from the ends where it is a minimum to the interior where it is a maximum.

The same result could be accomplished by using plates with flat inner surfaces having thereon cleaning brushes in which the pile increases in length from the ends inwardly. This construction would likewise result in a gradually increasing cleaning pressure on the film as it entered between the brushes.

Figure 7:
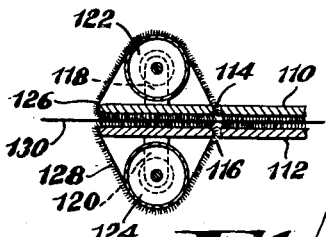
Fig. 7 is still another modification useful where long continued operation is necessary.

In some situations it is necessary that the enlarging camera or projector be used over a long period of time or with large quantities of film, with no opportunity afforded for removing and cleaning the brushes. In such cases, it may be desirable to have the brushes arranged so that they can be conveniently shifted whereby new brush material will replace that which has already accumulated a large amount of dust. A typical construction is shown in Fig. 7, in which the upper and lower plates 110 and 112 have toward the ends beyond the range of the film openings transverse slots 114 and 116 slightly wider than the width of the brushes. Between these slots and the ends of the plates are suitable bearing supports 118 and 120, which carry rollers 122 and 124, over which pass endless brushes 126 and 128, as shown. The brush surfaces that rest against the film 130 are the same as those previously described. If these surfaces become clogged with dust, the operator may then rotate rollers 122 and 124 to cause the brushes to shift slightly toward the ends of the plates, thereby presenting clean brush surfaces adjacent the film opening. In this way, the enlarging camera may be kept in continuous operation without the necessity of stoppage for cleaning the brushes. If desired, mechanical means for shifting the brush surfaces periodically or continuously may be used.

If the construction of Fig. 7 is used, the upper and lower jaws 12 and 14 of the enlarging camera may be appropriately shortened and the supports 24 and 26 modified accordingly. This is merely a matter of design and could be readily accomplished by simple mechanical expedients.

I claim:

1. The combination of an enlarging camera and a film holder and cleaner, comprising a light source and a lens, a supporting platform on which said film holder and cleaner may be mounted, said film holder and cleaner comprising two separable plates, each plate having an aperture therethrough, means for maintaining said apertures in alignment when said plates are in face-to-face engagement, each plate having areas recessed endwise of its aperture, the areas at the sides of each aperture being higher than the recessed areas, brushes on the interior faces of said plates positioned in said recessed areas, the surfaces of said brushes extending above the areas at the sides of said apertures, means associated with said camera for urging said plates together whereby a film longitudinally positioned between said plates may be cleaningly engaged by said brushes at the ends of said aperture and frictionally engaged by the areas at the sides of said apertures.

2. The combination of an enlarging camera and a film holder and cleaner, comprising a light source and two lenses, a supporting platform intermediate said lenses in which said film holder and cleaner may be mounted, said film holder comprising two separable plates, each plate having an aperture therethrough, means for maintaining said apertures in alignment when said plates are in face-to-face engagement, each plate having areas recessed endwise of its aperture, the areas at the sides of each aperture being higher than the recessed areas, brushes on the interior faces of said plates positioned in said recessed areas, the surfaces of said brushes extending above the areas at the sides of said apertures, a film positioned in said holder and cleaner, means for urging said plates together whereby said film may be cleaningly engaged by said brushes at the ends of said aperture and frictionally engaged by the areas at the sides of said aperture, said film holder and cleaner and film substantially sealing the space on the upper side of the lower lens, said upper lens resting on said upper plate and substantially sealing the space on the upper side of said film whereby, after said film has been moved between said brushes to present a dust-free area at said apertures, additional dust particles from the adjacent air will be prevented from settling on said film at said apertures.

3. Means for removing dust particles from a film, comprising two plates, each having an aperture therethrough narrower than the width of the film, means for maintaining said apertures in alignment when said plates are in face-to-face engagement, shallow recesses at the opposite ends of said apertures on the interior faces of said plates, brushes positioned in said recesses, the areas at the sides of said apertures being higher than the bottom of said recesses, but lower than the surfaces of said brushes, whereby a film positioned between said plates when sufficient compressive pressure has been brought to bear thereon will be cleaningly engaged by said brushes at the ends of said aperture and frictionally engaged by the areas at the sides of said apertures to enable said film to be held substantially flat.

ROLAND L. SMITH.